Sept. 26, 1944.   M. P. CHAPLIN ET AL   2,359,201
PULP MOLDING DIE
Filed Nov. 27, 1939   4 Sheets-Sheet 1

Inventors,
Charles J. Chaplin
Merle P. Chaplin

Sept. 26, 1944.  M. P. CHAPLIN ET AL  2,359,201
PULP MOLDING DIE
Filed Nov. 27, 1939  4 Sheets-Sheet 2

Inventors,
Charles J. Chaplin
Merle P. Chaplin

Fig. 15
Fig. 16
Fig. 17
Fig. 18

Inventors,
Charles J. Chaplin
Merle F. Chaplin

Sept. 26, 1944.   M. P. CHAPLIN ET AL   2,359,201
PULP MOLDING DIE
Filed Nov. 27, 1939   4 Sheets-Sheet 4

Inventors,
Charles J. Chaplin
Merle P. Chaplin

Patented Sept. 26, 1944

2,359,201

UNITED STATES PATENT OFFICE 2,359,201

PULP MOLDING DIE

Merle P. Chaplin and Charles J. Chaplin, South Portland, Maine, assignors to Chaplin Corporation, Portland, Maine, a corporation of Maine Application November 27, 1939, Serial No. 306,382

11 Claims. (Cl. 92—54)

This application is a continuation-in-part of U. S. Serial 171,156 (Patent No. 2,326,758, dated August 17, 1943) covering Method of and apparatus for producing pulp articles, filed October 26, 1937.

One of the most inexpensive and useful methods of constructing molding dies is to provide a perforated form of the desired shape, and to cover this form with a woven wire screen of reasonably fine mesh, made from brass, copper or other suitable materials.

These woven wire cloth materials, however, are capable only of a limited amount of distortion or stretching to enable it to conform to the die surface. When the distortion of the woven wire is too great, it either tears or ruptures, or the mesh becomes so distorted as to cause it to fail to function properly as a pulp molding surface.

It is the purpose of the present invention to provide means whereby a molding surface may be made up from a sheet of woven wire cloth distorted a minimum amount, but nevertheless adapted to fit a mold of such size and shape as would make it impossible to use a sheet of wire cloth formed in one piece to fit the mold without a seam or joint in some portion thereof.

Both of the aforementioned applications while discussing the production of seamless and tubular paper products, i. e., textile cones, state that such description is intended as illustrative rather than limiting, and that articles of widely varying nature may be produced. Examples of such articles, in addition to textile cones, may be egg flats and cartons, loud speaker cones, etc.

It is the purpose of this application to disclose other die structures than those specifically applicable to textile cone manufacture, and to disclose new and novel methods for making certain irregular die structures. While the die structures herein illustrated and discussed are quite different from those necessary or useful to manufacture textile cones, these dies do, however, employ the same principle of retention or locking of molding screens on the die surfaces, as was disclosed in the aforementioned application.

Molding dies of the type herein disclosed, as well as those discussed in the aforementioned application, are used to form or mold pulp articles from liquid pulp mixtures, these mixtures being composed of fibres and some liquid such as water, the liquid being drawn thru the die covering and die perforations, leaving a layer or coating of felted fibres on the molding surface. The water of formation is drawn away thru and from the die, and the layer of fibres deposited on the molding surface may be pressed by a complemental die, which die also serves to remove the molded article from the molding die on which it was made, thereby enabling this die to produce additional articles.

Operation of pulp molding dies is a well understood art, and it is unnecessary to discuss their functions in greater detail. As before pointed out, the ideas which have been disclosed relative to die structures and screen coverings is applicable to a wide variety of die sizes and shapes, but, as illustrative of typical die structures which can usefully employ the methods herein and heretofore described, reference is made to the following figures:

Fig. 3 is a section through the die of Fig. 1 on line 3—3.

Fig. 4 is a fragmentary sectional view, considerably enlarged, through the die of Fig. 1 on line 4—4.

Fig. 4a is a fragmentary sectional view, considerably enlarged, through the die of Fig. 3 on line 4a—4a.

Fig. 5 is a fragmental view of a die area, showing such area in plan and the associated molding screen and corrugated locking bar in section in the plane of the die area.

Fig. 6 is a fragmentary sectional view, considerably enlarged, of a modified form of molding screen anchorage.

Fig. 7 is a plan view, considerably enlarged, looking at the underside of the anchorage shown in Figs. 4 and 4a.

Fig. 8 is an enlarged section on the line 8—8 of Fig. 4a.

The above mentioned prior application illustrates and describes a die structure particularly designed to produce a long, tapered molded pulp article. This type of structure provides a molding surface whereby uniform pulp body can be deposited over all areas, and where the molding screen can be made up in one or more sections without unduly stretching or weakening any portion, with provision for locking or securing adjacent molding screen edges without interrupting the molding surface.

Particular die structures herein illustrated require certain modifications in screen retaining means due to their particular shape. For purposes of illustration a deep fairly large article has been selected, and such an article can be produced by the die structure illustrated in Figs. 1, 2 and 3. It would be impracticable to form or stretch a molding screen to fit such a die shape, as the forming operation would unduly weaken certain portions of the screen, thereby tending to produce an imperfect article and require frequent screen replacement.

It is also necessary, in order to secure adequate screen life, to prevent the screen from working, moving or sliding on or over the die surface, as such movement must necessarily bend or flex the screen at one or more points, and this continued flexing or bending will eventually cause the screen to break or fracture, thereby rendering it unfit for further use.

Figure 1:
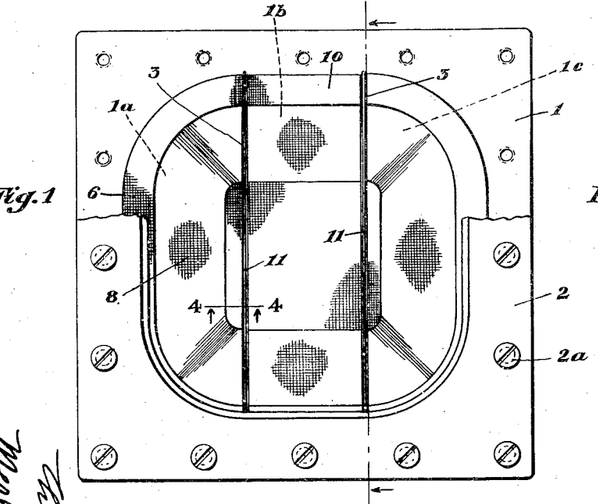
Fig. 1 is a plan view of a die for producing a rectangular, relatively deep, molded pulp article where it is difficult to form or stretch a molding screen the full depth of the die without unduly weakening certain sections. Also a die shape where it is desirable or necessary to secure or anchor the molding wire at or near the bottom of deepest die portion.
Figure 9:
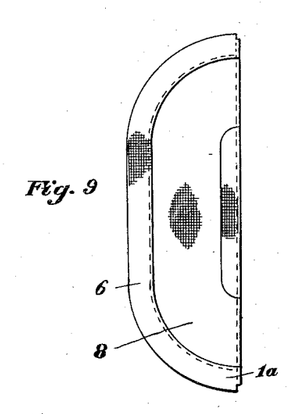
Fig. 9 is a plan view of the shaped molding screen or die covering for use on or over one of the end die sections of Fig. 1.

Referring to the die of Fig. 1, the die I is here shown made up as an integral unit having a plurality of slots, 3 cut in its surface thereby partially separating the die into a plurality of sections or areas Ia, Ib and Ic. These sections or areas are tied together about their circumference 5 and also by intermediate tie sections or bars 4. The screen sections are formed, as illustrated in Figs. 9 to 13 inclusive, to accurately fit and cover certain die areas. The screen section illustrated in Fig. 9 is adapted to cover either die portions Ia or Ic. It consists of a flange portion 6, a locking portion 7, intermediate of which is a shaped area 8 formed to the die contour of die section Ia.

Figure 12:
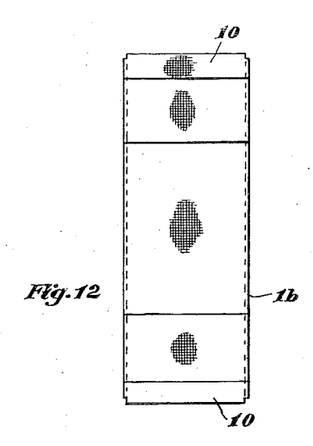
Fig. 12 is a plan view of the shaped molding screen or die covering, for the central section of the die of Fig. 1.
Figure 13:
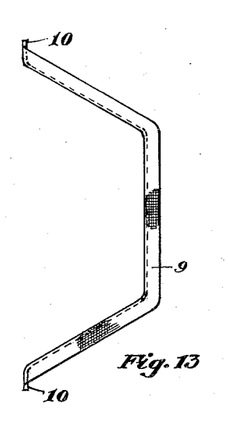
Fig. 13 is a side view of the shaped molding screen of Fig. 12.
Figure 14:
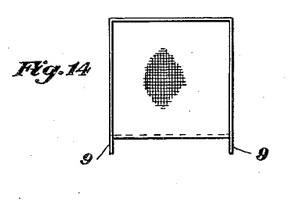
Fig. 14 is an end view of the shaped molding screen of Fig. 12.

Similarly, the screen section of Figs. 12, 13 and 14 consists of two locking sections 9, two flange sections 10 intermediate of which is a central area formed and shaped to fit the central section Ib of the die of Fig. 1.

In assembling the molding screen in place, the clamp ring 2 is removed and the several screen sections are placed on the die surface with the flange portions 6 and 10 resting on the top of the die, and with the locking portions 7 and 9 projecting downwardly into slots 3. With the screen coverings in place retaining members 11 are pushed in place between the locking portion 7 of one screen section and the abutting locking portion 9 of an adjacent screen section. This firmly clamps the screen sections in place as is indicated in either Fig. 4 or 4a. In other words, said retaining members 11 clamp the screen in place by applying to the locking portions 7 and 9 thereof, compression acting transversely of the slots.

Figures 3, 4, 4A, 5, 6, 7, 8:
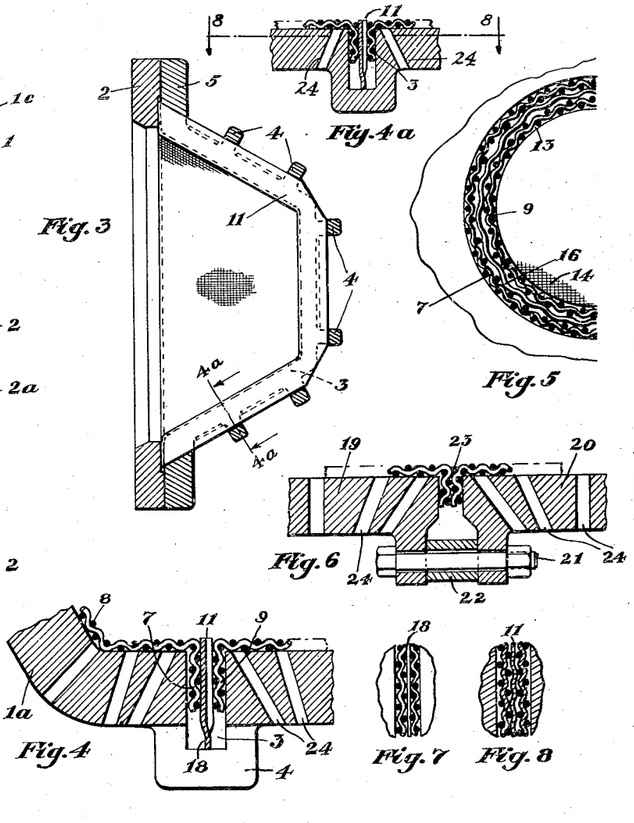

The retaining members 11 rest on the bottom of the slots 3 and on bars 4 as is indicated in Figs. 3, 4 and 4a. The upper edge comes flush with the upper screen and flange surfaces 6 and 10, and the flange or rim 6 and 10 of the screen sections as well as the clamp bars 11 are all secured in place by the clamp ring 2, held in place by screws or bolts 2a.

Figure 10:
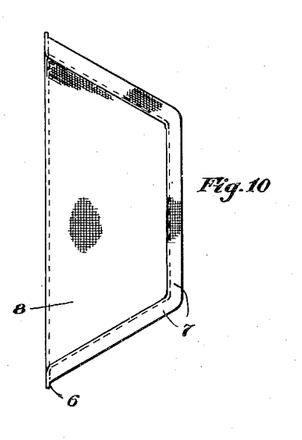
Fig. 10 is a side view of the shaped molding screen of Fig. 9.
Figure 11:
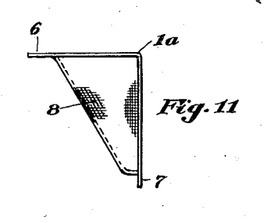
Fig. 11 is an end view of the shaped molding screen of Fig. 9.

It will be seen that the screen section illustrated in Figs. 9, 10 and 11 can be readily and simply formed or shaped without unduly stretching or weakening the screen structure. The screen section illustrated in Figs. 12, 13 and 14 is even simpler to form or shape. However, if the combined screen, of which these several sections make up the complete die covering, were pressed or formed from a single screen section, certain portions or areas of the screen at the bottom of the die will be very materially stretched and weakened, and there will be considerable wrinkling and closing up of the mesh of the screen about the edge or rim of the die.

Even if such a screen were formed and installed, its life under use would be relatively short. The reason for this shortness of life is because each time a molded pulp article is formed on the molding screen surface, there is a certain tendency for the fibres of the article to become interlocked with the screen surface. Further, the molded article is usually pressed rather firmly by a second complemental die, which has the further effect of pressing the fibres into the molding screen rendering them all the more firmly interlocked in the screen mesh. After the molded article has been pressed, it is removed from the molding die and screen by the second or pressing die, this removal being aided by application of vacuum to the surface of the pressing die, and of compressed air under or beneath the surface of the molding die.

Articles having steep or relatively steep sides, and with a certain amount of fibre interlocking to the screen, naturally results in a tendency to remove the screen from the die surface, leaving it attached to the molded article. Were it not for the fact that the screen is secured about its periphery or edge by a clamp ring, this would invariably happen. However, the clamp ring prevents the rim or edge of the molding screen from lifting away from the die surface, but the article as it moves away from the molding die, being carried by the second or pressing die, carries the steep-sided molding screen surface with it for a short distance or until the natural die taper allows the screen to move away from the molded article surface an amount necessary to relieve the interlocking of the fibrous surface to the screen mesh. This results in an upward bending of the molding screen at or near the clamp ring or rim of the article. The formation and pressing of a subsequently formed molded article pushes the molding screen back into place. This continued motion or bending of the molding screens, at or near the upper edge, eventually results in their being cracked or broken.

However, if the lowermost portions of the screen are locked in place as illustrated in the die structure of Fig. 1, screen motion relative to the die is very largely prevented, and screen life thereby greatly increased. The die structure of Fig. 1 illustrates only one of the many shapes or styles of dies in which the methods herein described of locking the molding screen in place may be usefully applied.

In certain cases of die shapes which have relatively large, flat areas, it is sometimes necessary or desirable to secure these flat areas in place in addition to other sectional locking means. There is shown in Fig. 5 one method by which this may be accomplished. Instead of a straight, or longitudinal groove, such as is used and shown in the die of Fig. 1, a circular groove 13 is cut in the die surface covering a certain part or section of area over which it is desired to secure the molding screen in place. This flat area or molding screen surface can then be made up in two pieces, one a central circular piece with a downwardly depending flange for fitting into the groove 13, with the outer section 15 of the molding screen having an opening of proper size with a downwardly depending flange formed of the screen these two flanges fitting snugly in the groove 13 and locked in place by any suitable locking member 16, or other equivalent device or method.

It is obvious that any locking area where adjacent screen sections are secured to the die surface, must provide adequate drainage for the water of formation to be taken thru the molding screen uniformly at all points. Preferably, we lock the screen sections in place by a corrugated locking member 11 having a corrugated section adjacent to the molding surface and a straight-edge section for bearing on the retaining bar 4. The upper portion of this locking bar is corrugated an amount which will give drainage spaces between it and the wire which it clamps in place, as indicated in plan view of the top of the die shown in Fig. 8, in which the corrugated locking bar is shown at 11. Preferably, the lower edge at 18 is made straight to facilitate entering the locking bar between the wire sections to be clamped, and to enable the corrugated portion of the locking bar to wedge the screens tightly in place. Viewed from the bottom, the straight bottom edge of the locking bar is illustrated in Fig. 7 at 18.

Figure 2:
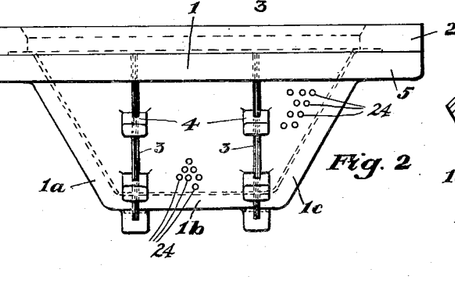
Fig. 2 is a side elevation of the die of Fig. 1.

It is, of course, obvious that the size of the die itself cannot and must not be changed by the act of locking the molding screens in place. Hence the structure as illustrated in Figs. 1, 2 and 3 provides for making the die as an integral structure in which are machined or cut the locking slots 3. This slot or cut leaves the rim or edge of the die intact, and the central portions are tied together by a plurality of bars 4 of sufficient size and strength so that the wedging action in clamping the screen sections in place will not change or open the slot width and thereby change the slot or die shape.

Certain die structures may have places or areas where it is difficult to employ the integral connecting bar 4. In this case, these die sections can be joined as illustrated in Fig. 6 where die sections 19 and 20 are held together by bolt 21 being spaced apart the proper distance to maintain die size and shape by spacer 22. In this case, the molding screens are clamped at 23 between the edges of dies or sections 19 and 20 with plain or corrugated locking bars used or not as desired. The water of drainage is drawn thru the screen, and thru the holes 24 in the die sections, these holes being located as closely as possible to the point where the screens are locked in place. The clamping area or depth at point 23 is made fairly narrow, thereby allowing drainage thru the clamp area as the wires making up the screen mesh are not crushed sufficiently by the clamping operation under these conditions to render this area water-tight.

Figure 15:
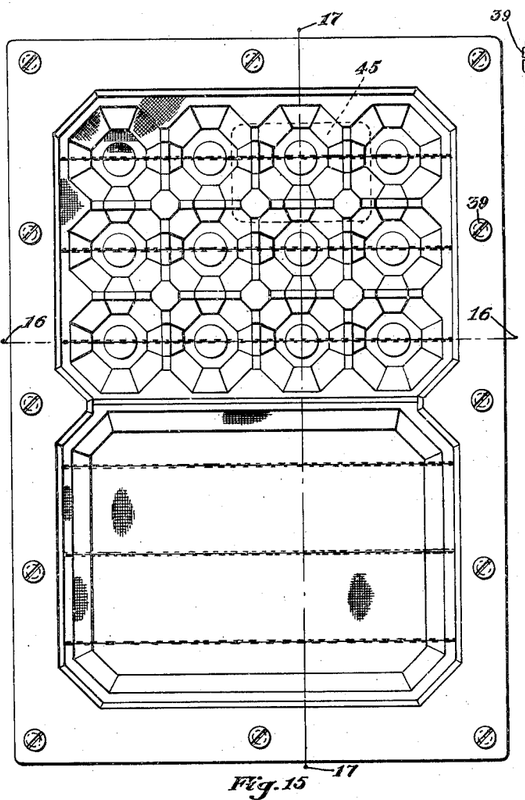
Fig. 15 is a plan view of a more irregular die structure such as might be used to form an egg carton or box.

Referring to the die structure shown in plan view of Fig. 15, we provide herein a method of building up an irregular die structure quickly and economically, together with means for securing a molding screen in place over its surface which screen is firmly secured in place, particularly at all deep die areas or points, thereby minimizing its moving or sliding over the die surface and its consequent breakage.

The several die sections 30 to 36 inclusive may be mounted in a chamber or frame 37 and clamped about the edge by clamp ring 38 secured in place by screws 39. These several sections divide the die shape where it is most desirable and necessary to secure the molding screen in place, and in such a manner that the several sections of the molding screens can be readily formed wihout unduly stretching or weakening the screen structure.

These several die sections 30 to 36 inclusive may be made from castings machined to proper size and shape. Preferably, however, we make these several sections by a deposition, electro-forming or casting process, employing any suitable material deposited or built up on a master form or shape, one such form or shape being illustrated in Fig. 23. This form is used to produce the die section illustrated in Fig. 19.

Electro-forming, deposition or casting processes consist in depositing on a prepared form a material in a similar manner commonly employed for electroplating, except that the layer is allowed to build up to a substantial thickness, and the form or master is initially prepared so that this relatively thick layer or shape can be readily removed from the form after the required thickness has been built up. This enables a large number of dies to be built up from a single set of forms, thereby greatly reducing the cost of dies made in quantity.

The die structure herein taken as illustrative, is suitable for making an egg box or egg carton having therein a plurality of pocket sections, with a cover portion connected to this pocket section by a hinge structure which will enable it to be folded over, forming a closed container. This is a particularly difficult die shape to cover with a wire screen, and it has heretofore been necessary to employ other die structures, either of the perforated metal, slotted bar, or similar types, to produce articles having such irregularly shaped surfaces as this particular die requires. Were screens to be formed over the entire die area, they would be either torn or ruptured during formation or greatly weakened over certain areas. These weakened areas would bend, work and slide during use, and the screen life, therefore, would be extremely short.

However, by dividing the die structure into sections, preferably along lines of greatest die depression or depth, the several screen sections become such that they can be readily formed or shaped, and their assembly in the die structure enables them to be locked in such a manner that they will not readily move over the die surface during use.

Figures 19, 20, 21, 22, 23, 24:
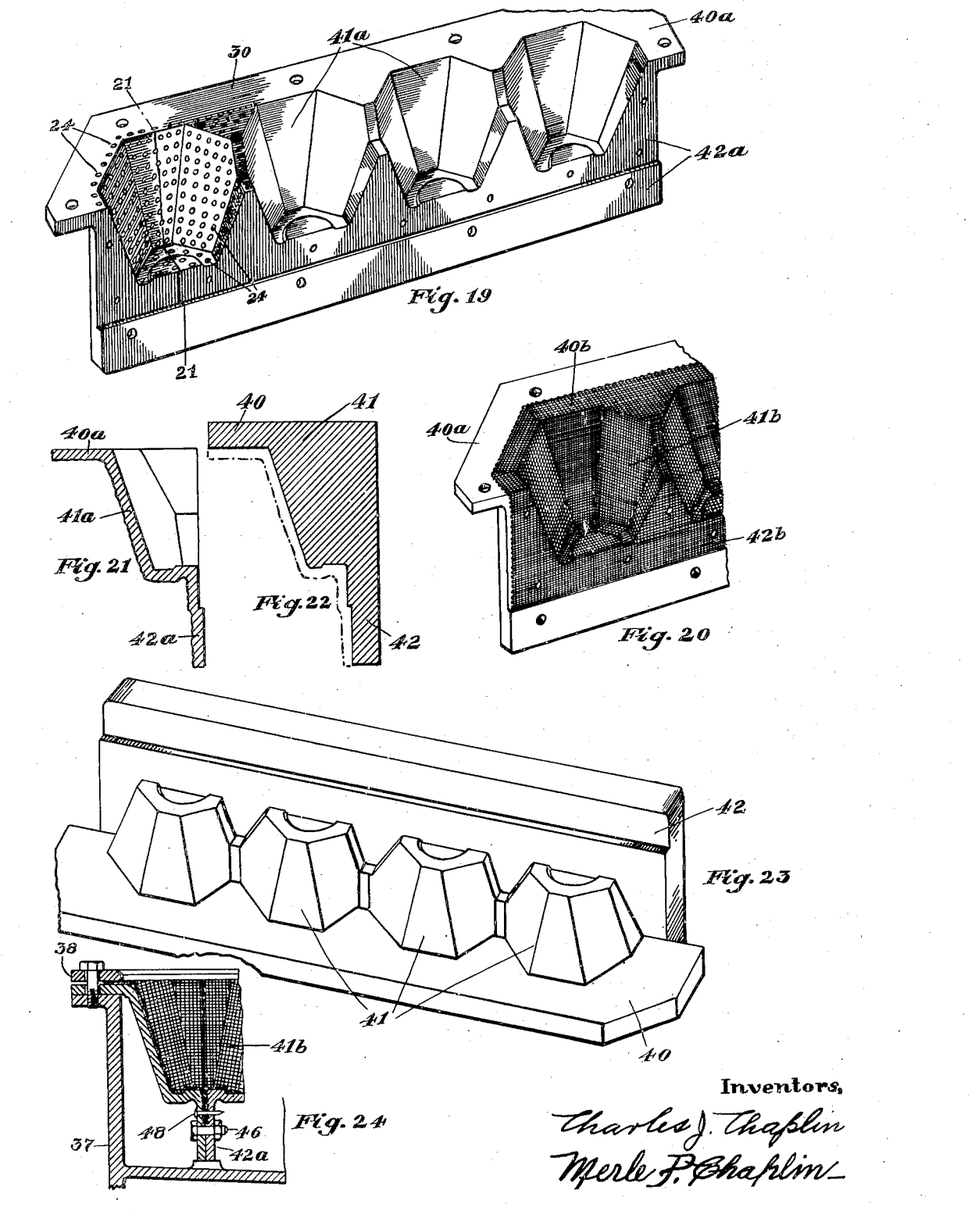
Fig. 19 is a perspective view of one of the die sections used to make up the die of Fig. 15.
Fig. 20 is a fragmentary perspective view of a portion of the die section of Fig. 19 with its formed molding screen in place.
Fig. 21 is a section through the die structure of Fig. 19 on line 21—21.
Fig. 22 is a section through the master former or mold on which the die section of Fig. 19 is built, said section being taken on the same plane as Fig. 21.
Fig. 23 is an outside inverted view of the master form used to produce the die section of Fig. 19.
Fig. 24 is a section through adjacent die sections with the molding screen in place.

In making up such a die structure, a number of forms or masters are made, each form or master being capable of shaping or producing a certain section of die structure. Illustrated in Fig. 23 is a form capable of producing the end section 30 shown either in Fig. 17 or 19. This form has a flange portion 40 for forming the flange area 40a of the die section, a plurality of pocket-shaped sections 41 for forming the several half-pockets 41a and a right angle portion 42 for forming the screen locking and connecting portion 42a.

To form a die section such as 30, the master form of Fig. 23 with its surface properly prepared to receive an electro-deposit, is immersed in a charged solution, containing the proper metals, chemicals, etc., and a coating is built up on the die surface in the manner already described. Areas on which deposits are not desired are coated with some insulating material, thereby preventing any metallic deposit at these points. After the form of Fig. 23 has been immersed for the proper time, it is removed, the die structure taken off, and the form is then ready for re-use to build additional die sections.

The particular method herein described contemplates the building up of each die section separately, and then of assembling these several sections together to form a complete die structure. As the form produced on the masters follows accurately the master shape, it is possible to build each section of proper size so that when they are matched and fitted with each other they will form a complete die, accurate as to size, contour and shape. On dies of this type, and particularly those with somewhat less intricate structure, the complete die can be electro-cast in one piece, and slotted as described and illustrated by the dies shown in Fig. 1, in which case the molding screens can be locked in place by the methods heretofore described for the die of Fig. 1. Or the several die sections can be cast individually either accurate to size and shape or with such additional machining as may be necessary to accurately fit the die sections together.

Figure 16:
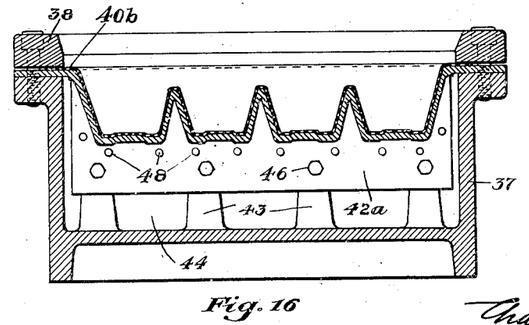
Fig. 16 is a section through the die, clamp ring, and holder on line 16—16 of Fig. 15.
Figures 17, 18:
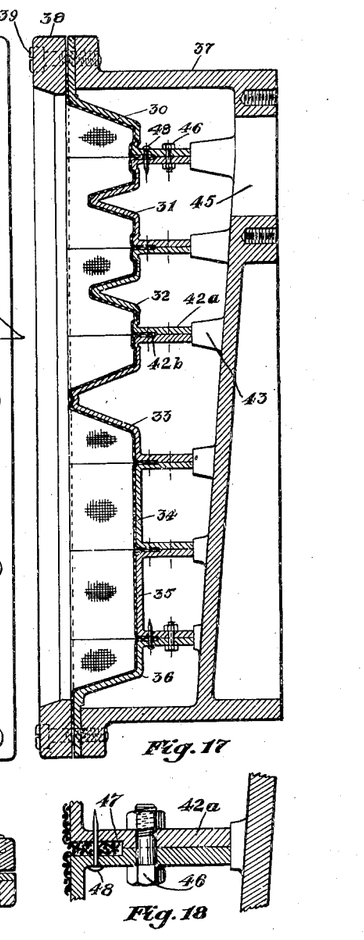
Fig. 17 is a section through the die, ring and holder of Fig. 15 on line 17—17.
Fig. 18 is a section, somewhat enlarged, showing a form of molding screen locking structure and die supporting structure.

For supporting the central areas of the die structure, the lower edges of the flange portions 42a may rest on suitable supports 43 in the frame 37 as in Figs. 16 and 17. These flanges will then form an area or support which will hold the die in proper shape both during the formation period and also withstand the pressing of the article during the pressing and transfer operation.

These supports 43 in the frame 37 are provided with openings 44 therebetween so that the water of formation will gravitate to the lowest point in frame 37 from which point it may be removed thru opening 45.

It will be observed also that these flange sections 42a match closely against each other as illustrated in Fig. 18, the several sections being secured to each other by means of bolts, functioning as compression means, or other suitable devices 46. The upper portion of these flanges when assembled together provide a slot or opening 47, see Fig. 18, in which adjacent molding screen sections are secured. These may be fastened in place by the clamp friction of adjacent die sections or by a plain or corrugated locking bar, as indicated in Fig. 4, or they may be secured in place by a number of pins 48 driven thru the flange portion of the molding screen after it is finally in place, holes for these pins having been drilled or otherwise provided thru the slot or recessed portion 42b.

It will be observed in Fig. 16 that the flange section 42a extends the entire width or length of the die section, thereby reinforcing this section and making it stiff and rigid. All sections are clamped in place at their edge, and close to the end of flange 42a by means of clamp ring 38, which not only holds the die sections in place, but also clamps the flanges of the several screen sections. The inner edge of this clamp ring 38 shapes and defines the edge of the molded pulp article by cutting off suction from the molding screen at this point. All die sections are provided with holes or perforations 24 (see Figs. 4 and 6) over such surfaces as are covered by the molding screen and on which surfaces it is desired to deposit a layer of pulp. These holes are also shown in the left hand half-pocket section illustrated in Fig. 19, and it is understood, of course, that the other three pocket sections, as well as all other portions of the die surface are provided with these drainage openings, even though they may not be shown on all views of the several dies.

Fig. 20 shows a portion of one end of the die portion of Fig. 19, with the formed molding screen in place ready for assembly with the next or adjacent section. The flange portion 40b is made wide enough so that it can be clamped and fastened securely in place by the clamp ring 38. The locking section 42b is made just deep enough so that it will enter the slot provided for it between the die sections, and, if desired, can be secured in place by the pins 48. The central portion 41b of the screen covering is shaped to form the several half pockets, and these pockets, being, in effect, relatively shallow as will be observed from looking at the sectional die shown in Fig. 21, readily permits the molding screen to be shaped to fit these pockets without unduly stretching or weakening its structure.

Not only is it possible to so design and build intricately shaped dies so that they may be readily covered with a molding wire screen having its mesh stretched or distorted a minimum amount, but it is also possible to further reinforce the wire mesh screen after it has been shaped to fit the die by some adequate method which will reinforce the wire strands and lock them firmly to each other in their shaped position. This reinforcing of the formed wire sections adds to their stiffness and rigidity, and is a further safeguard against their moving relative to the die surface while in use.

With the die structure illustrated in Fig. 17, it is necessary to remove the entire die from the frame in case it is desired to change or repair the molding screen. This removal is necessary to get at and remove the pins 48 used as an added insurance that the locking portions of the screens in the bottom of the die pockets remain firmly fixed in place.

However, with the die structure shown in Fig. 1, it is possible to renew or repair one or all sections of the molding screen simply by removing the clamp ring 2 and withdrawing the locking bars 11. It is, of course, obvious that these methods are interchangeable and inter-useable between different die structures herein illustrated, and many other die structures which might readily utilize this method.

There are many instances where it is desired to make up a few samples of a new design or shape of a molded pulp article. This may frequently be an intricate shape, and one which does not permit the use of a unitary screen covering. Its shape and style may also be sufficiently intricate that the die surface cannot be readily machined except at considerable expense and trouble.

In such instances, it is possible to build up a die for production of sample molded pulp articles by electro-casting the die in sections, on forms shaped by hand of some easily workable material such as wood, plaster, or soft metals. When so made, the form is customarily used only once, and in case it is wished to make up more than one sample die, sufficient extra forms are initially made so that one can be used for each electro-cast section.

In certain cases where it is desirable to produce a number of dies at the same time, a number of casts or forms are made from the first hand or other master, each of these forms being used simultaneously to electrocast a die section. There is a certain amount of extra work required in preparing these extra sections, but frequently this extra work is justified in enabling a considerable number of die sections to be in production at the same time.

Where a considerable quantity of dies are to be made, however, it is usually desirable to make master forms and tools of durable materials from which tools the several die sections can be cast, stamped or formed quickly, and with a minimum of labor.

In cases where only one die is necessary for the making of preliminary samples, the design can be worked out and a die made of wood, plaster, modeling clay, or any other suitable material, and a plaster or soft metal master die made from this model. This model die can then be covered with a layer of wax, clay or other material, the thickness of this layer being that desired for the molded pulp layer to be deposited on the moulding die after it is finished. Suitable allowance should be made for the shaped wire screen covering for the molding die, and also for the transfer die, in case this die is to be wire covered.

After covering the model die as above, a second plaster or soft metal master is made, which will be of the proper shape and contour for the transfer due. If necessary, one of the plaster masters can be reversed by making a second master from the first, so that the molding and transfer dies when made from these masters will mate each other.

These plaster or soft metal masters are then used to electro-cast the molding and transfer dies, or die sections, as may be desired. In case die sections are necessary or desirable, the plaster or soft metal masters can be cut or sawed into parts, the width of the saw cut being just enough to provide for the wire locking recess. Electro-casts are then made of each of these cut sectional masters, and these electro-casts assembled together, each with its formed wire screen section, to make up the complete die.

These electro-cast dies or die sections may be built up sufficiently thick to form the entire die structure, or they may be built up as thin shells, these shells backed or reinforced by any suitable material, thereby making a die of any desired thickness but having an accurate contoured face or surface of the desired die shape.

It will thus be seen that I have provided several ways by which a molding die of intricate design may be made, and this die covered with a fine mesh wire screen, on which the pulp materials can be deposited. As fine mesh screen can be employed as necessary or desirable, this screen covering can be made up in as many sections or parts as necessary, so that no part or section requires undue distortion or stretching to fit it to the die contour. As these sectional screen coverings are locked at frequent intervals to the die surface, and particularly at the deepest points or areas of the die, all parts of the screen are held from moving or bending, and this greatly increases the life of the screen coverings.

The term "open faced" die is used herein and in the art to which the invention pertains, to distinguish this type of die from the so-called "hollow" type of die, such as exemplified by United States Patent No. 1,492,555, granted May 6, 1924, to Cooper or United States Reissue Patent No. 14,262, granted February 20, 1917, to Rivers. A hollow die is one wherein the die has a cavity formed within relatively movable or separable sections which must be moved apart or separated to open the die cavity sufficiently to allow removal of the pulp article therefrom. In a die of the open faced type, in contradistinction, the contoured forming, molding or drying surface of the die, with which the pulp article cooperates, is wide open to the discharging face of the die so that the article can be positioned on or removed from the die without having to first open a die cavity by moving apart or separating the parts or sections of which such die may be constructed.

Having thus described our invention, what we claim is:

1. An interiorly chambered pulp molding die having an exterior, open faced, contoured molding surface provided with a peripheral portion and having drainage passages to the chamber in the die and provided in said molding surface with at least one locking slot also having drainage communication with the chamber in the die, wire mesh screen in contact with and overlying the contoured molding surface and having at least one locking portion extending into and secured within the locking slot thereof, said wire mesh screen also having at least one marginal extension projecting peripherally beyond the contoured molding surface, and attaching means for securing the marginal extension of the wire mesh screen to the die peripherally of and beyond said contoured molding surface.

2. An interiorly chambered pulp molding die having an exterior, open faced, contoured molding surface provided with a peripheral portion and having drainage passages to the chamber in the die and provided in such contoured molding surface with at least one locking slot also having drainage communication with the chamber in the die, wire mesh screen in contact with and overlying the contoured molding surface and having at least one locking portion extending into the locking slot thereof, said wire mesh screen also having at least one marginal extension projecting peripherally of and beyond said contoured molding surface, a retaining member positioned in said locking slot to clamp the locking portions of said wire mesh screen therein, and attaching means for securing the marginal extension of the screen to the die peripherally of and beyond said contoured molding surface.

3. An interiorly chambered pulp molding die having an exterior, open faced, contoured molding surface provided with a peripheral portion and having drainage passages to the chamber in the die and provided in such contoured molding surface with at least one locking slot also having drainage communication with the chamber in the die, wire mesh screen in contact with and overlying the contoured molding surface and having at least one locking portion extending into the locking slot thereof, said wire mesh screen also having at least one marginal extension projecting peripherally of and beyond said contoured molding surface, a retaining member positioned in the slot and in contact with the locking portion of the wire mesh screen therein to secure said locking portion in the slot, said retaining member being corrugated longitudinally of the slot to cause drainage through the slot between said member and the screen, and attaching means for securing the marginal extension of the wire mesh screen to the die peripherally of and beyond said contoured molding surface.

4. An open faced pulp molding die for molding open faced articles, comprising a molding portion provided with an open faced contoured molding surface having therein drainage openings and at least one locking slot with spaced apart opposing side walls, a peripheral portion surrounding said contoured molding surface, wire mesh screen in contact with and overlying said contoured molding surface and having at least one locking portion extending into and anchored within the locking slot by compression acting on said locking portion of the wire screen transversely of said slot to clamp said locking portions between the opposing side walls of the slot, said wire mesh screen also having at least one marginal extension overlying the peripheral portion of the die, and clamping means overlying the marginal extension of the wire mesh screen to clamp said extension to said peripheral portion of the die.

5. An open faced pulp molding die for molding open faced articles, comprising a molding portion provided with a contoured molding surface having therein drainage openings and at least one locking slot with spaced apart opposing side walls, a peripheral portion surrounding said contoured molding surface, wire mesh screen in contact with and overlying said contoured molding surface and having at least one locking portion extending into the locking slot therein, said wire mesh screen also having at least one marginal extension overlying the peripheral portion of the die, a removable retaining member positioned in said slot and fitting the slot sufficiently tightly to compressibly clamp the screen in the slot, and clamping means overlying the marginal extension of the wire mesh screen to clamp said extension to said peripheral portion of the die.

6. A pulp molding die comprising a contoured foraminous molding portion having a contoured molding surface through the entire thickness of the wall of which extends at least one locking slot, spacers extending across said slot remote from said molding surface to accurately space apart the opposite edges of the slot, a peripheral portion surrounding said contoured molding surface and rigid therewith, a wire mesh screen overlying the contoured molding surface and having at least one locking portion extending into and secured within the slot of the latter, said wire mesh screen also having at least one marginal extension overlying the peripheral portion of the die, and clamping means overlying the marginal extension of the wire mesh screen to clamp such screen to said peripheral portion of the die.

7. A pulp molding die comprising a contoured molding portion having a contoured molding surface provided with drainage openings and surrounded by a peripheral bordering portion, said contoured molding surface being provided with at least one longitudinally endless locking slot extending therethrough and spaced throughout from said peripheral bordering portion, wire mesh screen in contact with and overlying said contoured molding surface and having at least one locking portion extending into and anchored within the locking slot therein, said wire mesh screen also having at least one marginal extension overlying the peripheral portion of the die, and attaching means for securing the marginal extension of the wire mesh screen to said peripheral portion of the die.

8. A pulp molding die comprising an open faced, contoured, molding portion embodying a plurality of rigidly assembled sections consecutively embracing one another to collectively form a contoured molding surface surrounded by a peripheral portion, said molding surface having therein drainage openings and also a locking slot, wire mesh screen in contact with and overlying said contoured molding surface and having at least one locking portion extending into and anchored within the locking slot therein, said wire mesh screen also having at least one marginal extension overlying the peripheral portion of the die, and attaching means for securing the marginal extension of the wire mesh screen to said peripheral portion of the die.

9. An open faced pulp molding die comprising a plurality of rigidly assembled foraminous sections collectively forming a contoured, open faced, molding surface and each of which sections is provided at its back with a connecting portion having bolt openings therein, wire mesh screen in contact with and overlying the molding surface area of each section and having locking portions extending into the joints between said sections, and bolts extending through alined openings in said connecting portions of said sections for clamping said sections together with the locking portions of the wire mesh screen secured between them.

10. An open faced pulp molding die comprising a plurality of transverse foraminous die sections assembled in edge to edge relation to collectively form a depressed, contoured, open faced molding surface, wire mesh screen conforming to and overlying the molding surface area of each of said sections with projecting locking portions of said mesh extending into the joints between such section and adjacent sections, and compression means acting upon said sections in a direction substantially parallel to the plane of symmetry of the molding surface to force said sections toward one another with the said locking portions of the wire mesh screen secured between them.

11. An open faced pulp molding die for molding open faced pulp articles, comprising a molding portion provided with an open faced contoured molding surface having therein drainage openings and a plurality of locking slots extending across said open faced contoured molding surface and each of which has spaced apart opposing side walls, a peripheral portion surrounding said contoured molding surface, wire mesh screen in contact with said open faced contoured molding surface and having locking portions extending into and anchored within said locking slots by compression acting on said locking portions of the wire mesh screen transversely of said slots to clamp said locking portions between the opposing side walls of said slots, said wire mesh screen also having marginal extensions overlying said peripheral portion of the die, and clamping means overlying the marginal extensions of the wire mesh screen to clamp said extensions to said peripheral portion of the die.

MERLE P. CHAPLIN.
CHARLES J. CHAPLIN.